Nov. 8, 1966  C. F. CZECH  3,283,548
DRY CLEANING MACHINE
Original Filed July 31, 1963  8 Sheets-Sheet 1

INVENTOR.
CLIFFORD F. CZECH
BY
Wolfe, Hubbard, Voit & Osann
ATTYS

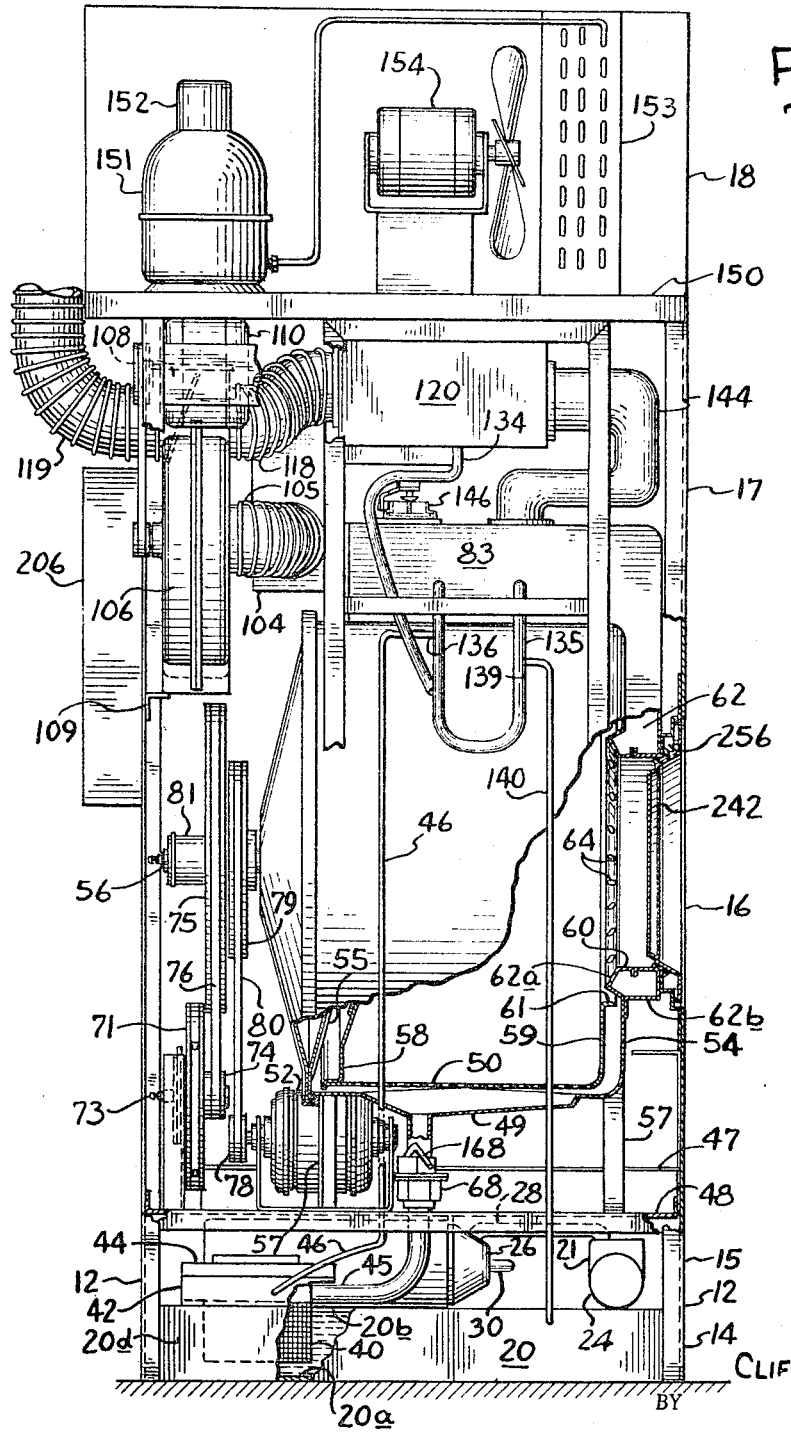

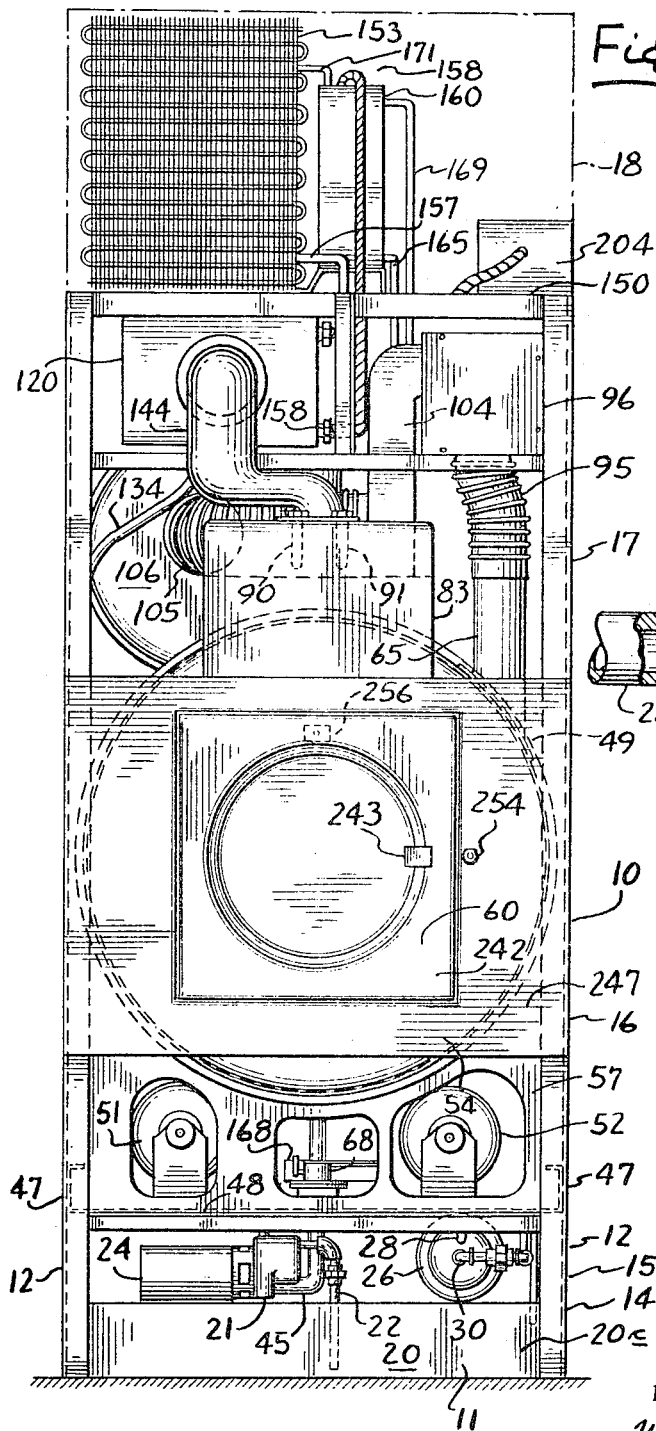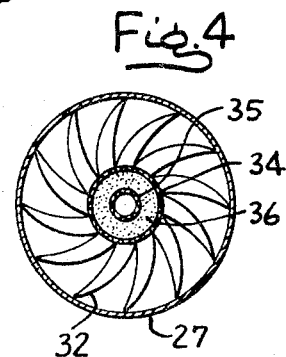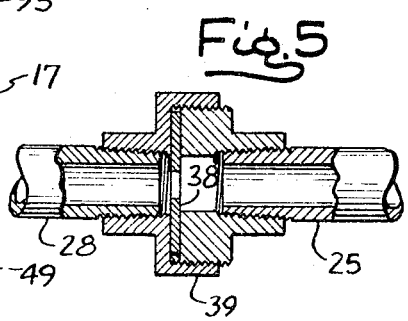

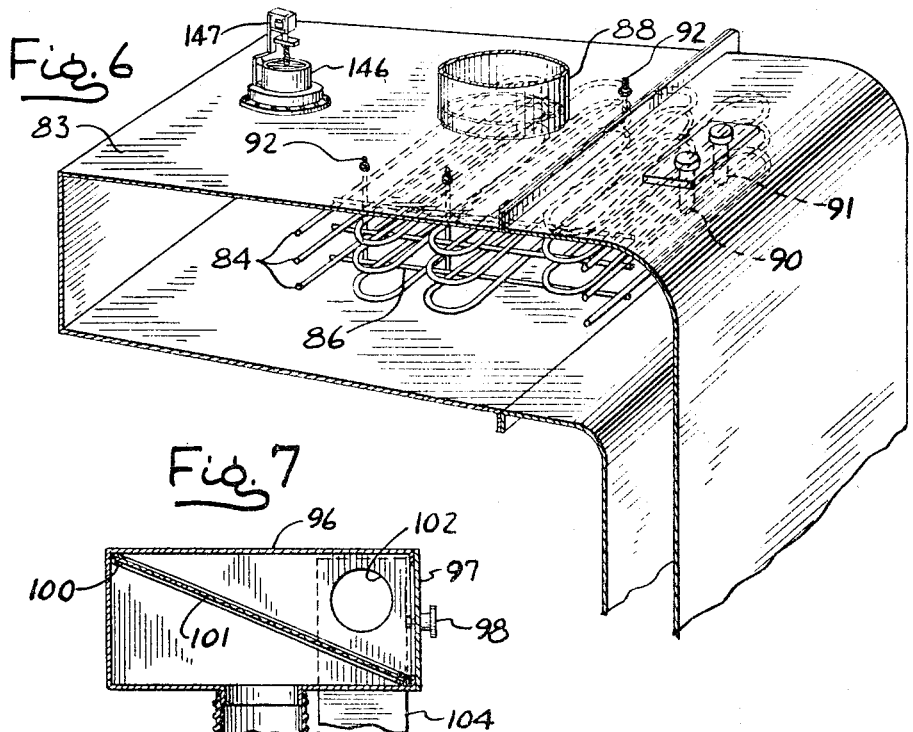
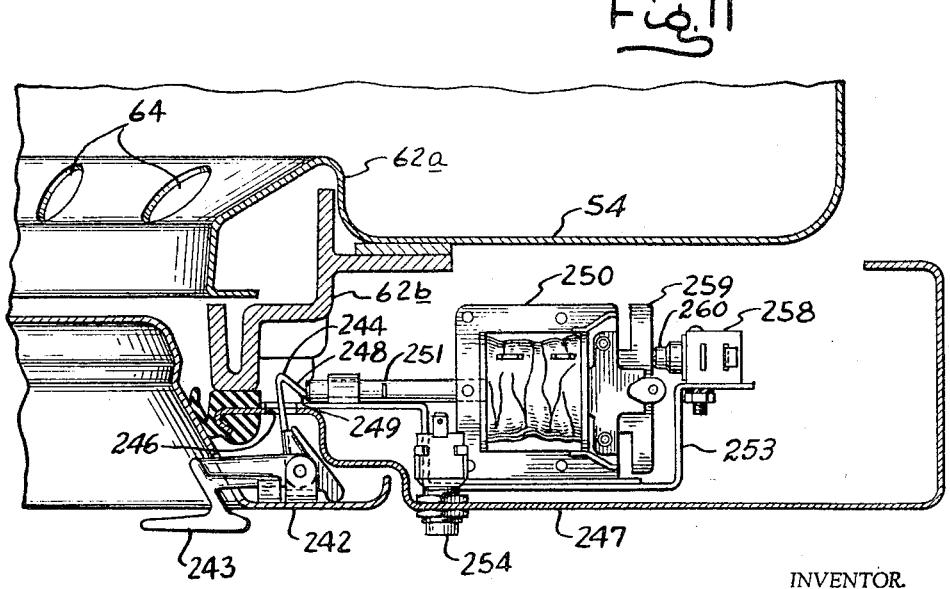

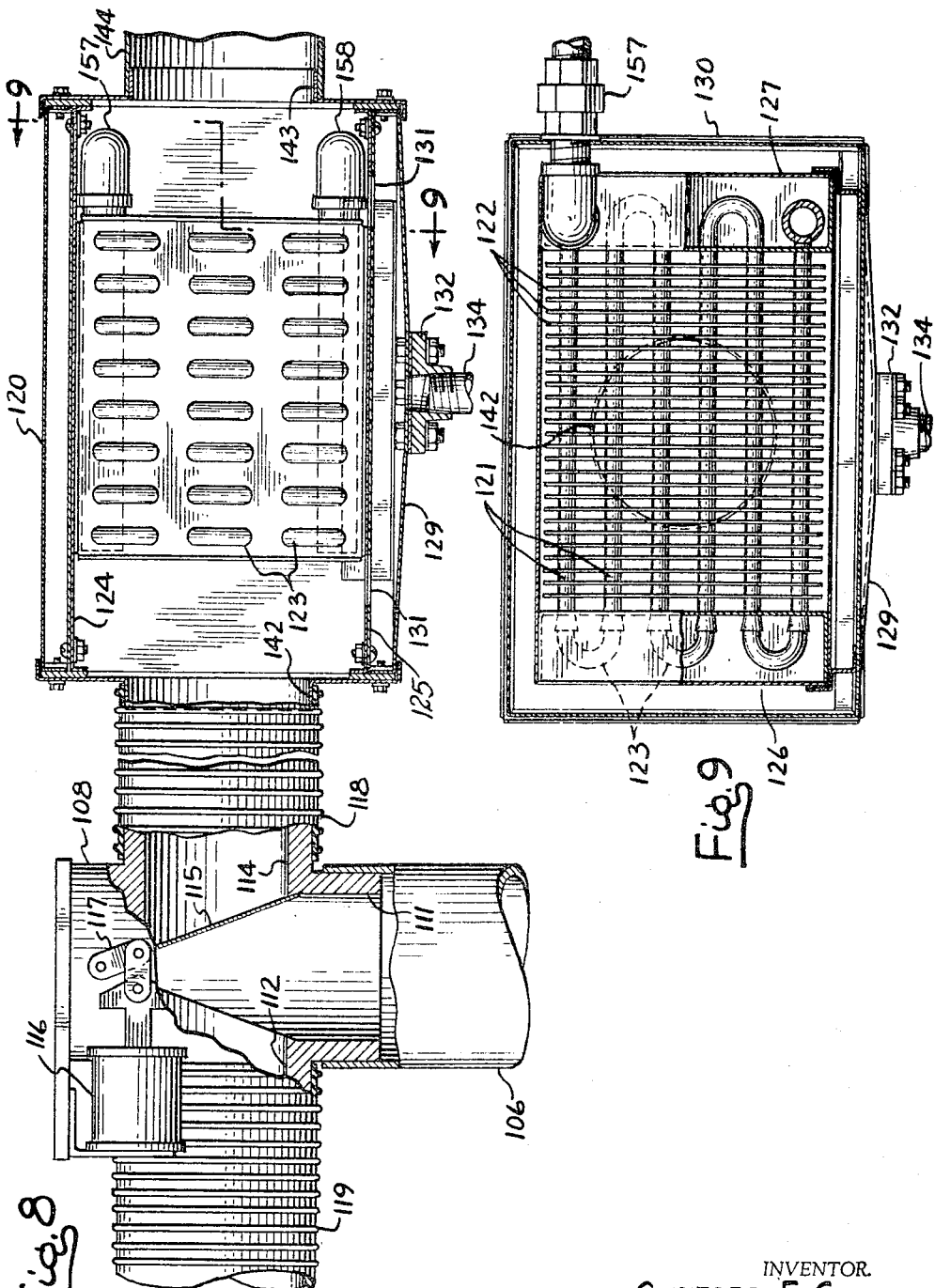

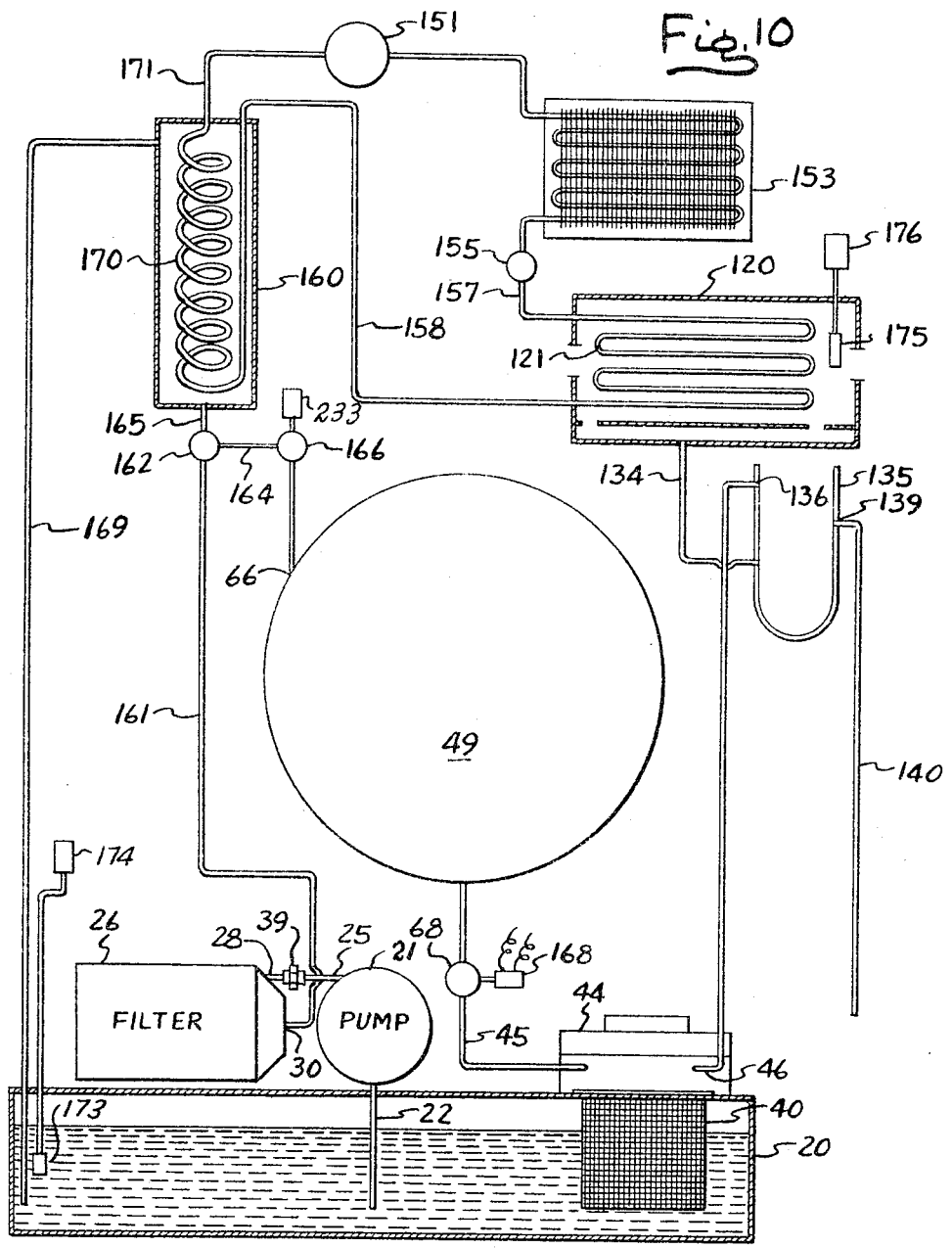

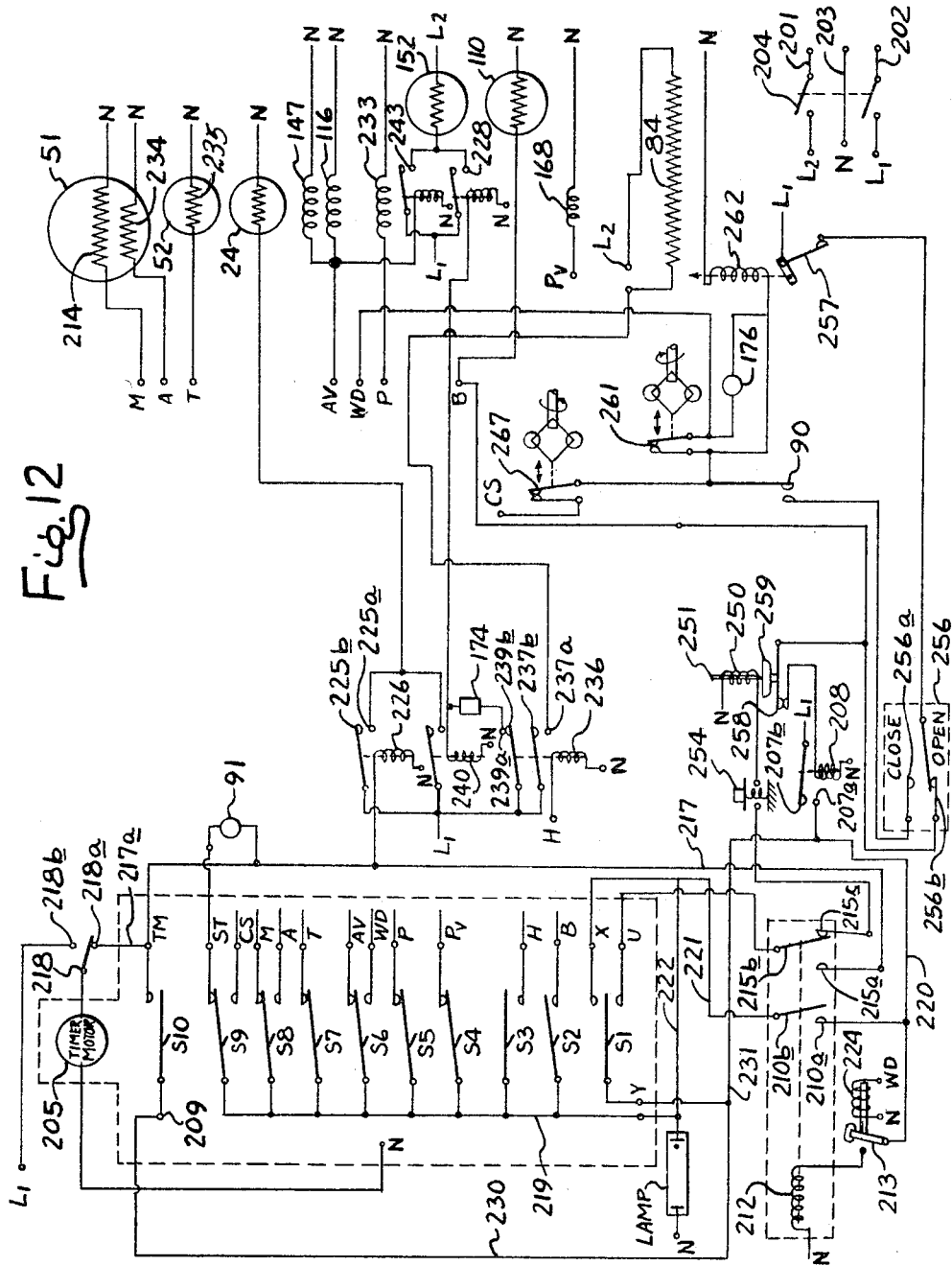

Fig. 13

| CIRCUITS | | 0<br>50 | 5<br>45 | 10<br>40 | 15<br>35 | 20<br>30 | 25<br>25 |
|---|---|---|---|---|---|---|---|
| TIMER MOTOR | TM | ■■■■ | ■■■■ | ■■■■ | ■■□■ | ■■■■ | ■■■■ |
| DRY THERMO | ST | | | | ■■ | | |
| SPIN SAFETY | CS | | | ■ | | | |
| TUMBLE-SLOW | M | ■■■■ | ■■■■ | | | ■■■■ | |
| TUMBLE-FAST | A | | | ■■■■ | ■■ | | |
| AIR VALVE | AV | ■■■■ | ■■■■ | ■■■■ | ■■■■ | ■ | |
| TUMBLE-SAFETY | WD | | | | | ■ | |
| SPIN MOTOR | T | | ■ | ■■■■ | ■■ | | |
| SOLVENT VALVE | P | ■■■■ | ■■■ | | | | |
| DRAIN VALVE | P$_v$ | | ■ ■ | | | | |
| HEATER | H | | | | ■■ | | |
| BLOWER | B | | | | | ■■■■ | ■■■ |
| | X | ■■■■ | ■■■■ | ■■■■ | ■■■■ | ■■■■ | |
| | U | ■ | | | | | ■ |

United States Patent Office 3,283,548
Patented Nov. 8, 1966

3,283,548
DRY CLEANING MACHINE
Clifford F. Czech, Ripon, Wis., assignor to McGraw-Edison Company, Ripon, Wis., a corporation of Delaware
Original application July 31, 1963, Ser. No. 298,899. Divided and this application June 30, 1965, Ser. No. 482,001
2 Claims. (Cl. 68—12)

This is a division of application Serial No. 298,899, filed July 31, 1963, now Patent No. 3,250,097.

The present invention relates to dry cleaning machines and more particularly to automatically controlled dry cleaning machines capable of performing a complete cycle of cleaning and drying without attention from the operator after the cycle is started.

In the past, dry cleaning operations have been carried out in commercial establishments by operators who have been instructed in the operation and dangers of dry cleaning equipment and materials. Dry cleaning operations have more recently been made available for use by the general public in stores or establishments set up for the purpose. The customer of such a store or public establishment dry cleans his own clothes or garments in equipment and with materials of the store owner in return for a payment for their use. Such a customer has no knowledge of the operation or dangers incident to the use of the dry cleaning equipment and materials.

It is therefore an object of the present invention to provide a dry cleaning machine which may be operated in an automatic cycle without attention of the operator, except for loading, starting, and unloading the machine.

Dry cleaning is generally carried out by the use of volatile solvents, especially organic liquids, such as carbon tetrachloride, ethylene dichloride, perchlorethylene, and others. Perchlorethylene is the type of solvent or cleaning liquid commonly used in customer operated dry cleaning equipment. These solvents and cleaning liquids are relatively expensive and may, under certain circumstances, become a health hazard. In addition, efficient cleaning action by such volatile solvents and cleaning liquids depends on proper conditioning of the cleaning liquid.

A further object of the present invention is therefore the provision of a dry cleaning machine having means for safely handling the cleaning liquids and vapors therefrom to minimize the hazards resulting from their use. It is a related object to provide means for effectively conditioning the cleaning liquid used in the dry cleaning process.

Another object is the provision of a dry cleaning machine which requires a minimum of maintenance on the part of the owner of the dry cleaning establishment and providing a machine of the type which can be installed to give a pleasing appearance to the customer and at the same time have its various components readily accessible when maintenance is required.

A further object of the present invention is to provide a dry cleaning machine which is automatic in operation but requires a relatively small amount of floor space such that it is particularly suited for public stores or establishments in business and commercial areas where space is often limited.

Still another object is to provide a dry cleaning machine of unitary construction such that it may be shipped and installed with a minimum of erection and installation cost.

Other objects and advantages of the invention will become apparent upon reading the following detailed description and upon reference to the drawings, in which:

FIG. 2 is a side elevation of the machine of FIG. 1;

FIG. 3 is a front elevation of the machine of FIG. 1;

FIG. 4 is a cross section of a cartridge type liquid filter used in connection with the dry cleaning machine;

FIG. 5 is a longitudinal section of a portion of the fluid conduit to the liquid filter showing means for restricting flow;

FIG. 6 is a perspective of the heater used in the dry cleaning machine of FIG. 1;

FIG. 7 is a section of the lint filter taken along the section line 7—7 of FIG. 1;

FIG. 8 is a side elevation of an air diverting valve and condenser shown partially in section;

FIG. 9 is a cross section of the condenser taken along the line 9—9 of FIG. 8;

FIG. 10 is a diagrammatic representation of the cleaning liquid and refrigerating system of the dry cleaning machine;

FIG. 11 is a horizontal section of a safety door latch;

FIG. 12 is a diagrammatic representation of the electrical control circuit of the dry cleaning machine; and FIG. 13 is a graph representing the timed operation of the control switches for a cycle of operation.

Figure 1:
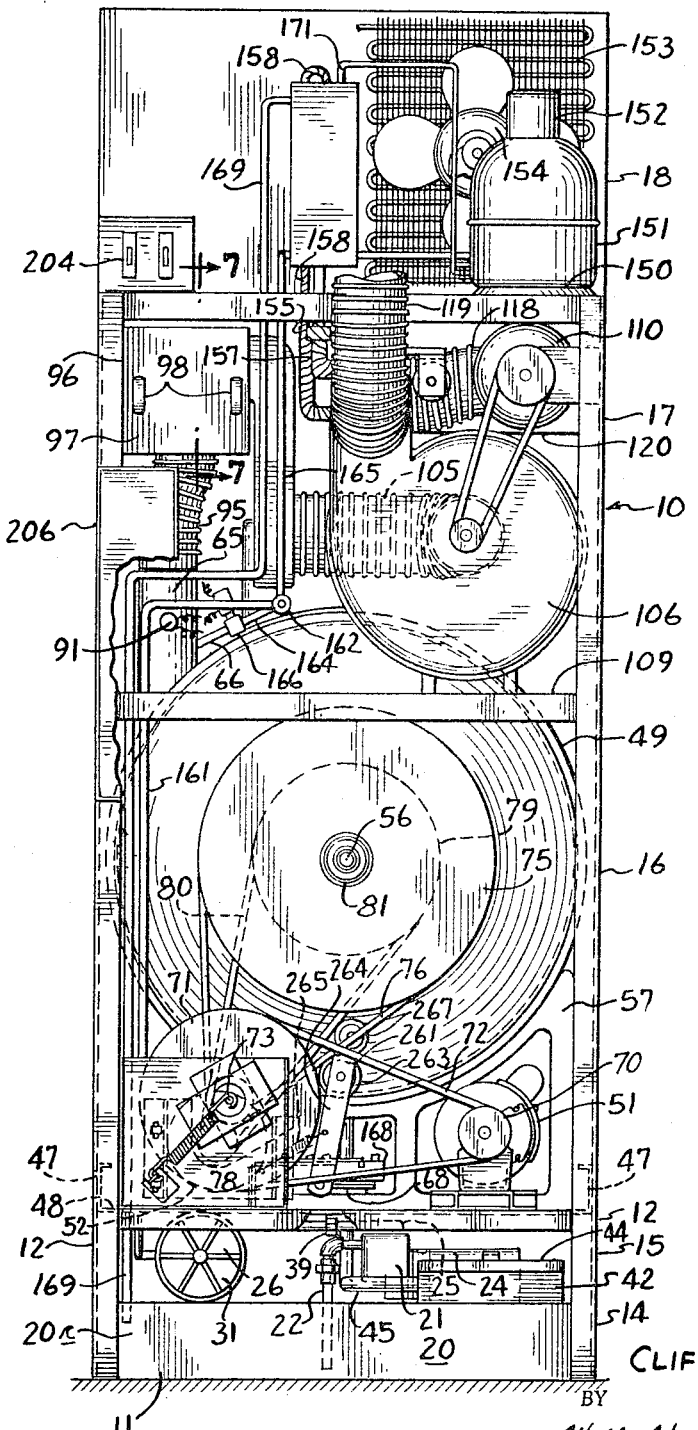
FIGURE 1 is a rear elevation of a dry cleaning machine embodying the present invention.

While a preferred embodiment of the invention will be described herein, it will be understood that it is not the intention to limit the invention to that embodiment. On the contrary, it is the intention to cover all alternatives, modifications, and equivalents as may be included within the spirit and scope of the invention as defined by the appended claims.

Referring to FIGS. 1, 2, and 3 of the drawings, a dry cleaning machine 10 embodying the present invention constructed to provide a compact device capable of unitary installation and utilizing a minimum of floor space. For this purpose, the machine is supported by a generally rectangular frame comprising a base 11 and corner uprights 12 secured thereto. In general organization, the components of the machine are arranged on stages or levels which, starting at the bottom, include a liquid reservoir level 14, a liquid pumping and filtering level 15, a tub and motor level 16, an air distribution level 17, and a refrigerating level 18. The terms "liquid" or "solvent" as used in this description are intended to refer to volatile cleaning liquid or solvent of the types heretofore described as used for dry cleaning.

Forming the liquid reservoir level 14 is a rectilinear tank 20 which also serves as the base support 11 for the machine. The bottom and top of the reservoir are rectangular metal plates 20a, 20b of the same size and shape as the cross section of the machine. To each corner of the bottom and top plates is fixed an upright corner post 12, as by welding. In the illustrative machine, the corner posts 12 are angle irons for increased strength and rigidity. Between the top and bottom reservoir plates 20a, 20b reservoir side plates 20c, 20d are sealed to their edges to complete the reservoir or tank 20.

Supported by the top reservoir plate 20b are pumping and filtering means for the cleaning solvent. As shown in the drawings, these means are mounted and supported by the top plate 20b of the reservoir or tank 20. The pumping means comprises a fluid pump 21 having an inlet conduit 22 which leads from the pump intake downwardly through the top plate 20b of the tank to a point near the bottom of tank 20. Driving the solvent pump 21 is an electric motor 24 such that cleaning liquid from the tank 20 is circulated by the pump 21 through an outlet conduit 25 to the inlet of filtering means in the preferred form of a replaceable cartridge type filter 26. The filter is enclosed in a cylindrical shell 27 having an inlet connection 28 and an outlet connection 30 in one end wall. The other end of the shell is closed by a removable cover 31 to permit the filter material to be removed and replaced when dirty.

One form of filter used in connection with the present machine is shown diagrammatically in FIG. 4 of the drawings. In this construction the replaceable filter element includes pleated filter material 32 such as suitably fabricated cellulose, paper or like material for extracting particles of dirt, sludge, and like impurities from the cleaning liquid or solvent. In the construction illustrated the pleats of the filter material 32 are made from a continuous cylindrical sheet and extend radially from a center cylindrical retainer 34 to the inside wall of the outer shell 27 with the grooves between the pleats extending axially of the shell. Solvent to be cleaned is admitted to the outside of the pleats, filters through the filter material, and flows radially inwardly through the inner retainer which is perforated for this purpose. Spaced inside of, and generally concentric with, the retainer 34 is a second cylindrical retainer 35 similarly perforated to permit the passage of solvent to the hollow center passage which leads to the outlet connection 30 of the filter. The annular space between the two retainers 34, 35 is filled with an adsorbent material 36 such as powdered carbon, for further purifying the solvent which flows through it by removing colorants, odors, fatty acids, and the like.

It has been found that the flow of cleaning liquids through the filter results in the formation of small channels or open cracks through the powdered carbon. These channels or cracks permit the cleaning fluid to pass through the layer of carbon without substantial or efficient purification. A novel means has been provided which reduces the tendency of the powdered material to form such channels or cracks. In the present instance this means comprises a restriction or orifice inserted in the conduit 25 which interconnects the pump 21 and the filter 26. For this purpose, a relatively thin circular disk 38 having a hole in its center is fixed crosswise of the conduit 25. By way of illustration the restrictor can be inserted in the conduit by cutting the conduit 25, threading the adjoining ends of the conduit, inserting the disk between the ends and connecting the ends together with a pipe union 39. It has been found that when using three-quarter inch iron pipe which has an inside diameter of approximately five-eighths of an inch, a disk an eighth of an inch thick with a hole three-eighths of an inch in diameter is effective to increase the efficiency of the filter and prolong its useful life. It is believed that the restrictor or orifice may cause the formation of eddies or pulses in the flow of liquid to the filter such that the powdered carbon and even the sediment collected on the filter material is jarred and repositioned, thus closing up incipient channels or cracks which may have been formed.

Also located on the pumping and filtering level of the machine is means for filtering or screening large particles such as lint, buttons, and the like from the cleaning liquid. For this purpose a perforated open top container 40, made of perforated sheet material or screen, is suspended from the top plate 20b of the reservoir 20 through an opening therein. As shown in FIG. 2, an outwardly extending horizontal flange is formed around the top edge of the container and rests on the top plate 20b about the container opening. Projecting upwardly from the top plate 20b, outside of the area supporting the filter container flanges is a vertical wall 42 which completely surrounds the flange supporting area. Resting on top of the wall 42, or hinged to it if desired, is a cover 44 which can be opened to permit the filter basket 40 to be removed for cleaning. Through the sides of the wall 42, cleaning liquid return or drain conduits 45, 46 project such that used cleaning liquid flows into the filter basket 40 before entering the reservoir. It is one aspect of the present filter that the basket 40 extends substantially below the level of cleaning liquid in the reservoir 20 to keep the screening and filtering area submerged. In this manner lint in the return cleaning liquid from clothes which have been cleaned has less tendency to mat against the perforated basket walls and cause clogging. By the described arrangement the lint tends to remain suspended in the liquid within the basket, leaving the basket perforations open.

Supporting the next upper level of components are front-to-back side channels 47 welded or otherwise fastened to the corner uprights 12 and a floor plate 48 fixed thereto. At this third level is positioned a clothes tub 49 and perforated inner clothes basket 50 with its power means including an electric tumble motor 51 and an electric spin motor 52. The clothes tub 49 is, in the exemplary form, a cylindrical tub mounted on a horizontal axis with front and back end walls 54, 55, and having depending support brackets or yokes 57 to hold the tub in position. Within the tub 49 is the cylindrical clothes basket 50 supported by an axle shaft 56 extending rearwardly from a back wall 58 and journaled in bearings in the rear wall 55 of the tub 49 for rotation on a horizontal axis coincident with the axis of the tub. Suitable bearing and axle means for the basket are well known in the art and need not be described in detail. The front wall 54 of the tub and the front wall 59 of the clothes basket have alined central openings 60, 61 for loading and unloading the basket 50. For drying clothes in the basket 50 after cleaning, there is provided an annular passage 62 around the loading opening 60 formed on its rear side by a forwardly opening "C" shaped bend 62a in the tub front wall around the opening 60 and formed on its front side by a rearwardly opening circular channel or collar 62b of "C" shape fixed to the front wall 62. The collar 62a has an opening in its top portion to receive drying air and to discharge it into the clothes basket through apertures 64 in the inner surface of the annular structure. Flow of air through the clothes basket and tub exhausts through a conduit fitting 65 fixed to the tub 49 at an upper side portion approximately midway from front to back and overlying an opening formed in the tub side wall.

The clothes tub 49 is also provided with means for introducing and draining cleaning fluid or solvent. In the machine of the drawings, cleaning fluid is introduced through a pipe or conduit 66 which connects with an opening in the tub wall adjacent the forward end and above the mid line of the tub. Drainage from the tub 49 is formed by a front-to-rear trough formed in the bottom of the tub side wall and a drain opening therein to which is connected the drain conduit 45. Interposed in the drain conduit is an electrically operated solenoid valve 68 for purposes to be described later.

For carrying out the cleaning, rinsing, and drying steps of the dry cleaning process, means are provided for rotating the clothes basket at the proper speed for each operation of the cleaning cycle. In the illustrative machine these means comprise the tumble motor 51, spin motor 52, and speed reducing transmission mechanism. Tumble motor 51 is a two-speed motor having a four pole winding 51a which when energized rotates the motor shaft at approximately 1750 revolutions per minute and a six pole winding which when energized rotates the motor shaft at approximately 1150 revolutions per minute. The tumble motor shaft is connected to the clothes basket shaft 56 through a double-speed down pulley and belt transmission including motor pulley 70 which drives a large intermediate pulley 71 through belt 72. Large pulley 71 is fixed on a common shaft 73 to drive a small intermediate pulley 74 which in turn drives a larger pulley 75 on the clothes basket shaft 56 through belt 76. The ratio of sizes of the respective pulleys is such that the basket is turned at about 50 revolutions per minute at the slow motor speed during the washing, rinsing, and air drying operations.

The spin motor 52 in the exemplary machine is a single speed motor of approximately 1750 revolutions per minute and drives the clothes basket through a motor shaft pulley 78 and a larger pulley 79 fixed to the clothes basket shaft 56. A belt 80 interconnects the pulleys which have a ratio of sizes to spin the tub at approximately 500 revolutions per minute and produce sufficient centrifugal force to extract a large portion of the cleaning liquid held by clothes saturated during the washing operation. In order to bring the clothes basket up to extracting speed rapidly and without overloading the spin motor or, in the alternative, using an expensive high powered spin motor, means are provided for energizing the high speed winding of the tumble motor 51 concurrently with the spin motor 52. When this is done the power of both motors contributes to the initial acceleration of the clothes basket. The tumble motor, because of its large speed reduction transmisison system, assists until the basket speed approaches seventy-five revolutions per minute. Thereafter, the spin motor which now has attained an appreciable speed continues the acceleration to spinning speed. So that the spin motor will not be required to pull the tumble motor upon continued acceleration, the tumble pulley 75 on the clothes basket shaft is drivingly connected thereto by a suitable one-way or overrunning clutch 81, the construction of which is well known in the art.

Proceeding now to the air distribution level of the dry cleaning machine, means are provided for circulating heated air into and out of the clothes drum or tub for final drying of the clothes following the centrifugal extraction. Means are included for heating the drying air, condensing out evaporated cleaning liquid and conditioning the clothes following drying. Starting with the heating means, a rectangular casing 83 having an arcuate undersurface to conform to the curvature of the clothes tub 49 is mounted directly on the top of the tub. The forward end of the casing 83 projects over the front of the tub 49 and has a vertical leg which extends downwardly to the air passageway 62 surrounding the tub loading opening 60. Within the horizontal portion of the casing are electrical resistance heating elements 84 of commercially available construction. The heating elements 84 are supported by a frame or rack 86. Drying air flows into the heater casing through an opening 88 positioned centrally of the casing directly over the heating elements and then flows across the heating elements to the front of the casing and downwardly to the air pasage 62 in the clothes tub 49.

In order to control both the temperature of the heating elements and the drying air, two thermostatic control switches 90, 91 are placed in the top of the casing 83 at its forward end. Safe operation of the heater requires that the surface temperature of the heating elements does not exceed a predetermined maximum temperature. Higher temperatures may cause decomposition of any cleaning liquid retained in the drying air and otherwise produce safety and health hazards. To minimize this danger, a safety thermostatic switch 90 is set to operate at about 200 degrees Fahrenheit. It has been found that by varying the position of the heating elements relative to the safety thermostat, the safety thermostat will indicate excessive surface temperature of the elements. For this purpose, the heating element support frame 86 is adjustably mounted in the casing by means of threaded fasteners or screws 92 which adjustably position and hold the heating elements in proper relation to the safety thermostat. It is intended that the proper adjustment be made when the machine is initially tested at which time accurate measurements can be made of element temperature and corresponding operation of the safety thermostat. If the element temperature is too high, when the thermostatic switch is actuated, the elements are moved toward the thermostat. Conversely, if the heating element temperatures are too low when the safety thermostat operates, the adjusting screws for the element support frame are changed to lower the elements and move them away from the thermostat.

The safety thermostat also provides a control for limiting the maximum air temperature in the event of failure of the air control thermostat 91. In normal operation, the air control thermostat 91 is set to operate at a lower temperature than the safety thermostat, for example, at 140 degrees Fahrenheit, such that drying air leaving the heater and entering the clothes tub 49 is at or slightly below the setting of the air control thermostat.

Drying air exhausts through exhaust fitting 65 and through conduit 95 to means for filtering lint from the air stream. For this purpose, a substantially self-cleaning filter is provided in the form of a rectangular enclosure or box 96 supported by the framework of the machine substantially directly above the tub exhaust outlet 65. The forward end of the filter box is closed and the rear end which is more or less flush with the rear of the machine frame has a removable door 97 held in place by latches 98 or other suitable means. Within the filter box is a rectangular frame 100 covered with a relatively light, closely woven fabric or cloth 101. The filter frame and cloth are supported in the filter box above an air inlet in the bottom of the filter and below an outlet 102 in the side of the box adjacent the top. The filter frame 100 is dimensioned to extend from side to side and end to end of the box 96 so that all air must pass through the filter cloth 101.

One of the features of the present filter is that the cloth 101 is not stretched tightly on the frame but, instead, hangs loosely which, together with the upward flow of air through the filter, provides self-cleaning. Any vibration of the filter cloth as by air flow or vibration of the machine frame when the power units are operating flexes the cloth sufficiently to knock off accumulated lint which then drops to the bottom of the filter box where it may be periodically removed. In the preferred form the filter frame 100 is slightly longer than the length of the filter box 96 and extends diagonally from the upper corner of one end to the lower corner of the other end, giving a maximum of filter area for a given size of filter box.

From the filter outlet 102 the drying air passes through a metal fitting 104 and a flexible conduit 105 to the intake of a centrifugal fan or blower 106. The blower 106 has a scroll-shaped housing with an upwardly directed outlet that is connected to an air diverting valve 108. The blower 106 is supported by one of the rear corner uprights 12 and a horizontal cross member 109 and is driven by an electric motor 110 positioned above the blower.

The air diverter valve 108 provides means for operating the air distribution either as a closed system or as an open system. In view of the relatively high cost of the cleaning liquid normally used in a dry cleaning operation, the closed system permits recovery of substantial amounts of liquid from the drying air. However, in order to remove odor from the clothes after drying and to prevent noxious vapors of the cleaning liquid from contaminating the cleaning establishment, the open system is used. To accomplish this, the diverter valve 108 of any suitable construction capable of directing an inlet flow of air to either of two outlets may be used. In the preferred form, the diverter valve comprises a vertical inlet passage 111, and an interconnecting transverse outlet passage having one end forming an exhaust outlet 112 and the other end forming an air return outlet 114. At the juncture of the inlet passage 111 and transverse passage a flapper valve gate 115 is pivotally mounted at its upper end so that its free end swings across the inlet passage 111 and alternately in front of the exhaust outlet and the return outlet. A spring biased electric solenoid 116 operating through a crank arm 117 fixed to the flapper gate 115 normally holds the flapper gate 115 to divert the air flow to the exhaust outlet 112, and when energized pulls the flapper gate 115 across inlet passage 111 to divert air to the return outlet 114.

In the air exhaust position of the diverter valve 108 the blower 106 draws air from the clothes tub and the same flows through the diverter valve exhaust outlet 112 to an exhaust conduit or stack 119 which takes the exhaust fumes and air usually to an elevated point outside the cleaning establishment. In the air return position of the diverter valve 108, the air from the blower 106 is conducted by air conduit 118 to a condenser means 120 to recover from the air evaporated cleaning liquid.

The condenser means 120 constructed in accordance with one aspect of the present invention comprises air cooling means for reducing the temperature of the cleaning liquid vapor to condense the same and safety means to permit continued flow of air in the event the cooling means becomes coated with ice. It has been found that sufficient water vapor may be present in the drying air to cause substantial icing of the cooling means and after continuous operation of the machine through a number of cycles to cause serious blocking of the air flow through the condenser to the heater 83. When this occurs the heater elements may reach undesirably high temperatures because of insufficient air flow to carry away the heat generated at the normal rate.

Referring in more detail to the condenser 120, the air cooling means is formed by a series of tubes or conduits 121 extending across the main air passage of the condenser. The tubes are joined at their ends by "U" connectors 123 to form a single continuous conduit through which cooling fluid is forced. Parallel to the flow of the air are closely spaced fins 122 soldered or otherwise fixed to the coolant tubes. Air is diverted past and between the fins by top and bottom plates 124, 125, side plates 126, and end plates 127. It is the narrow spaces between the fins 122 which may become filled with ice to the point of blocking the flow of air. The safety means to permit air flow even under such a condition comprises a by-pass channel or passage under the bottom air guide plate 125 and the bottom outside wall 129 of the condenser casing 130. To permit air flow through the by-pass, holes or slits 131 are provided in the bottom guide plate 125 longitudinally outwardly of the respective ends of the cooling coils and fins 121, 122. This by-pass, being removed from the low temperatures of the cooling coils remains free of ice blockage. In normal operation only a small proportion of the air goes through the by-pass because of the lower resistance and larger area of the main passage, but has sufficient area to carry substantial air volume if necessary.

Condensed cleaning solvent and water which is extracted from the air by the cooling means drips down to the bottom guide plate 125 and through suitable drain holes into the by-pass area. A drain connection 132 in the bottom casing wall 120 carries the condensate through a conduit 134 to the left leg of a "U" tube separator 135. The "U" tube separator has a first outlet 136 in the left leg above the inlet conduit connection for returning condensed cleaning liquid to the reservoir 20 through tube 46. Because of its higher specific weight, water mixed with condensed cleaning liquid settles to the bottom of the "U" tube and is forced upwardly into the right leg of the separator. An outlet 139 in the right leg positioned above the inlet conduit connection, but below the outlet connection 136, drains water from the separator through tube 140 which may lead to any suitable waste disposal means.

As previously described, the air circuit for the closed system is completed by air flowing into the condenser 120 through inlet 142 in one end wall of the condenser casing 130, through outlet 143 and through conduit 144 to the heater inlet 88. Completing the open system is a normally open inlet air valve 146 mounted on the rear top wall portion of the heater casing 83, to allow atmospheric air to be drawn into the heater casing and thence to the tub 49. Upon energizing an electrical solenoid 147 supported above the valve 146 a valve plate seats to close the valve. As will be further explained, fresh atmospheric air is used at the end of the cleaning cycle to remove odor and freshen the clothes.

At the top of the corner uprights 12 of the machine frame cross pieces 150 interconnect the uprights 12 to complete the frame, giving it rigidity and also form the support for the refrigerating means. The refrigerating mechanism may be of any suitable type, comprising a sealed compressor unit 151 driven by an electric motor 152, a cooler 153 for the compressed refrigerant, a cooling fan and motor unit 154, and an expansion valve or cap tube 155. Refrigerating apparatus of the foregoing type is well known and commercially available and hence need not be described in detail. Of interest in connection with practicing the present invention is the flow circuit of the refrigerant from the expansion valve 155 through conduit 157 to the condenser coils 121 and then through conduit 158 to a cleaning liquid heat exchanger or cooler 160 mounted on the top of the frame adjacent the refrigerating mechanism.

As will be seen, the dry cleaning machine as previously described forms a unitary structure supported by the uprights 12 and within the confines of the base 11. The front of the machine may if desired have a complete paneling covering the entire front of the machine or, if preferred, may have only a partial panel surrounding the loading opening with auxiliary or wall paneling covering the remainder of the front. In either case it is intended that the machine will be installed as a built-in unit with a wall partition extending from each edge of the front face of the machine. By this construction, the customer or operator has access only to the loading door and opening. The space behind the wall partition may also be separately ventilated for additional safeguard to the area of the establishment to which the customers or operators are admitted.

Referring now to FIG. 10 there is shown diagrammatically the piping and equipment which circulate and condition the cleaning liquid or solvent. The circuit illustrated comprises means for supplying filtered cleaning liquid to the clothes and return, means for maintaining the cleaning liquid at efficient working temperature, and means for recovering the evaporated cleaning liquid from the drying air. The circulating pump 21 as previously described pumps cleaning liquid from the storage tank 20 through suction line 22 and forces the liquid through conduit 25 to the filter 26 and from the filter outlet 30 through conduit 161 to a pressure relief valve 162 which is normally open to tub supply conduit 164 and discharges to cooler conduit 165 upon excess pressure build-up in feed line 161. Interposed between tub supply conduit 164 and the tub solvent inlet 66 is a normally closed solvent control valve 166 which is provided with an electrical solenoid control opening the valve 166 when energized to introduce cleaning liquid to the tub during the washing period of the cycle.

One of the features of the present invention is the provision of means for reducing the dry cleaning cycle by insuring rapid saturation of the garments or clothes and a rinse or second wash. For this purpose, a normally closed valve 68 moved to open position upon energization of electrical solenoid control 168 is placed in the tub drain conduit 45. During the initial portion of the washing period, the drain valve 68 is closed permitting the clothes tub to partially fill with cleaning liquid and the clothes to be saturated quickly. Approximately half way through the washing period after the clothes have tumbled in the liquid, solenoid 168 is energized allowing the dirty cleaning liquid to drain from the tub 49. Solenoid 168 is then deenergized allowing the drain valve 68 to close and the tub 49 is again partially filled with clean liquid for the balance of the wash. At the end of the washing period, solenoid 168 is once again energized, holding valve 68 open during the high speed spin period to permit the extracted cleaning liquid to drain to the storage tank 20. In the air drying period solenoid 168 is deenergized closing the drain valve 68 so that there is no tendency for air to be circulated through the drain line 45 with possible evaporation of solvent in the storage tank 20.

During the time that cleaning liquid is not used to fill the clothes tub 49, the liquid is continuously filtered or cooled, if needed, except during a portion of the air drying period. For this purpose cooling means in the form of a heat exchanger or cooler tank 160 receives cleaning liquid upon closing of the tub inlet control valve 166, the closing of which causes a pressure rise in feed conduit 161 opening relief valve 162 to cooler conduit 165. The cooler 160 is a cylindrical tank having an inlet connection to conduit 165 and an outlet to return line 169, the latter leading to the storage tank 20. Within the cooler 160 is a refrigerant coil 170 formed of suitable tubing. One end of coil 170 is connected to refrigerant line 158 leading from the condenser and the other end is connected to the refrigerant compressor 151 through line 171. The cooler coil 170 is adapted to receive and utilize refrigerant in series with the condenser coils 121. Such an arrangement in which one heat exchanger receives refrigerant from another is referred to in the refrigerating art as a "tail off system."

Means are provided in the form of a thermostatic element 173 placed in the liquid storage tank 20 for measuring and controlling through thermostatic switch 174 the temperature of the cleaning liquid. It is desirable to keep the temperature in the neighborhood of 75 to 85 degrees Fahrenheit. As will be explained presently, additional control means cooperating with the thermostatic switch 174 provide additional cooling of the liquid, if necessary, to keep its temperature within the preferred range.

In connection with the means for recovering cleaning liquid from the drying air, which includes the previously described condenser 120 and water separator 135, control means, in the form of thermostatic element 175 and electric switch 176 controlled thereby, is provided. Thermostatic element 175 is placed in the air stream on the outlet end of the condenser 120 for the purpose of measuring the cooled air temperature. If the temperature of the air leaving the condenser rises above a predetermined temperature, which is about 100 to 110 degrees Fahrenheit for perchlorethylene, the liquid is not being properly extracted from the drying air by the condenser. The thermostatic element at such high temperatures closes the normally open switch 176 to stop machine operation.

The automatic, sequential operation of the exemplary embodiment will now be explained with reference to FIG. 12 in which a control circuit for automatically sequencing the power units and operating valve means through a complete cycle of washing and drying clothes is shown diagrammatically. In addition, the control circuit incorporates safety devices to protect both the operator and the physical components of the machine in the event of power failure or malfunction.

Power for operating the various operating and control devices is provided by an electrical source, not shown, having a conventional three-wire conductor comprising two high voltage conductors 201, 202, and a neutral conductor 203. A two-pole manually operated master switch 204 physically positioned on the upper level of the machine frame is connected in series with the high voltage conductors 201, 202, and when closed, completes a circuit from the power source to the machine. For convenience the two high voltage conductors are represented through the diagram of FIG. 12 as $L_1$ and $L_2$, and the neutral conductor as N. In general, the control and small power devices are connected to and energized by conductors $L_1$ and N, while the heavy duty power devices, such as the refrigerating unit and the heater, are energized by $L_1$ and $L_2$.

Providing proper sequential control of the machine operations is a series of cam operated switches driven in timed sequence by a timer motor 205 and illustrated diagrammatically as S1 through S10, respectively. The timer motor, cam operated switches and associated relays are mounted in a control box 206 on the upper rear of the machine frame. Timer motors and cam switches are known in the automatic laundry field and do not require detailed explanation. Suffice it to say that the timer motor 205 drives a cam shaft which rotates a series of cams coacting with the various switches S1 through S10 to open and close the same at predetermined degrees of cam shaft rotation. The preferred sequence of opening and closing of the switches is represented on FIG. 13 in which the switch contacts engaged by the cam switches are represented by reference letters corresponding to the letters appearing on the circuit diagram of FIG. 12. The horizontal axis of the chart of FIG. 13 is divided into equal increments of rotation of the cam shaft which are also equal increments of time, except for one increment indicated as number eighteen. An entire cycle of operation is represented by twenty-five increments and, with the exceptions noted, comprises a cycle of slightly over 15 minutes. The increments of the cycle during which a switch contact is closed are shaded on the chart. The switch contact is open during the increments which are unshaded.

The illustrative control and power circuit of FIG. 12 is initially energized, assuming the master switch 204 is closed, by the closing of normally open contacts 207a, 207b of a main solenoid relay 208. The main relay solenoid 208 is energized through a plurality of safety devices which will be described hereinafter. Main relay contact 207b is connected to power line $L_1$ and contact 207a is connected to terminal Y of standby cam switch S1, to one terminal 209 of the timer motor cam switch S10, to one switch contact 210b of a power relay 212 and to one side of a manual start switch 213.

At the beginning of a cycle the timer mechanism is conditioned for energizing the timer motor 205 through cam switch S10, the slow speed winding 214 of clothes tumble motor 51 and the air intake and air diverting solenoids 147, 116. For this purpose, standby switch contact U, air valve switch contact AV, and low speed tumble motor switch contact M are engaged by their respective cam switches S1, S6 and S8. The cycle can now be initiated by manually closing start switch 213 which energizes the power relay closing normally open switch contacts 210a, 210b and 215a, 215b. Timer switch contact U, being energized from power line $L_1$ through cam switch S1 in turn energizes power relay contacts 215a, 215b which complete an electrical circuit to the timer motor through connectors 217, 217a and timer advance switch contact 218a starting the timer motor 205. The second set of power relay contacts 210a, 210b completes a circuit from the main power relay switch 207 to timer switch contact X and the common timer cam switch conductor 219 through conductors 220, 221, 222.

Although a manual start switch 213 is shown in the diagram of FIG. 12, it will be appreciated that a coin operated switch mechanism may be substituted if the dry cleaner is to be used in a public coin operated store. Various forms of such coin operated switch mechanisms are known in the art and include selector mechanism to determine the number of coins to be inserted, reset mechanism and coin rejectors. Electrical power for operating such coin devices can, for example, be obtained from the power relay normally closed switch contact 215c which is energized through timer switch contact U, before the power relay is actuated. For resetting either the manual start switch 213 or the coin mechanism after operation is commenced, a wipe-out relay 224 is energized by the closing of an appropriate timer switch contact after the cycle has commenced, such, for example, as contact WD which is energized during the twenty-first timed increment.

During the first timed increment, no cleaning operation is performed. The clothes are merely tumbled in the tub. However, means are provided during this increment for insuring that the cleaning liquid is in proper condition for the subsequent cleaning. For this purpose means are provided for energizing the liquid circulating pump motor 24 concurrently with the timer motor 205. In more detail, a normally open pump relay switch having one terminal 225b connected to power line $L_1$ and the other terminal 225a to the solvent pump motor 24 is actuated by pump relay solenoid 226, one side of which is connected to the timer motor conductor 217 and the other to neutral N. Thus, whenever the timer motor is energized, except by use of the timer advance switch contact 218b, the solvent circulating pump is also energized through relay switch 225. This circulation of solvent prior to cleaning has been found desirable for preventing the initial charge of solvent into the tub from carrying with it impurities such as may be present in a stagnant quantity of solvent. The precirculation of solvent also serves to condition the filter which may, upon standing without circulation, permit impurities to pass through.

Also, during the first increment, the refrigerating unit compressor motor 152 will be energized by means of thermostatic switch 174 and refrigeration relay switch 228 if the cleaning liquid temperature in the storage tank 20 exceeds the predetermined maximum as indicated by thermostat 173.

The timer motor, upon rotation of the cam shaft to the second timed increment, causes the timer motor and solvent valve cam switches S10 and S5 to close energizing contacts TM and P. Closing of contact TM completes a circuit for the timer motor through connector 217a, switch contact TM, terminal 209, and connectors 230, 231, to the main relay switch 207a. This circuit is in parallel to the timer motor energizing circuit through standby cam switch U and power relay contacts 215a, 215b, and insures continuous operation of the timer motor when standby cam switch U subsequently opens. The closing of the solvent valve cam switch P energizes solenoid 233 which controls the tub inlet valve 166 opening the latter to introduce cleaning liquid into the clothes tub. As previously explained, the cleaning liquid which during the first increment of time flowed through the cooler tank 160 now flows completely into the tub due to the closing of pressure relief valve 162. The low speed tumble motor cam switch M is still closed causing the clothes to be tumbled in the cleaning liquid to provide the necessary cleaning action.

On the third increment of the timer, standby cam switch S1 opens contact U and closes cam contact X. The closing of operating cam switch X energizes the common timer conductor 219 from the main relay switch contact 207a through an alternate circuit including connector 231, terminal Y, cam switch S1, and connector 222. The purpose for this alternate connection is to condition the circuit for continued energization of the timer switch terminals after the power relay 212 is deenergized at a subsequent increment of the timer control. In the particular circuit shown, the opening of standby cam switch contact U does not immediately deenergize the power relay 212, since the manual switch 213 is still closed.

During timed increments two, three, and four, the clothes container is filling with cleaning liquid and the tub is rotating at slow or tumble speed. However, at timed increment four, the solenoid operated drain valve 168 is energized through the closing of drain cam switch S4 and contact PV, thereby opening the valve 68 and allowing the cleaning liquid to drain from the tub. The drain valve solenoid 168 is deenergized at timed increment five, permitting the drain valve 68 to again close and the clothes tub 49 to refill for a second cleaning or deep rinse. This continues for two timed increments, after which the drain valve solenoid 168 is again energized by the closing of drain cam switch S4 and contact PV and remains energized during timed increments eight through fifteen, that is, up to and through a final rinse and through a high speed rotation of the clothes basket 50 to extract solvent from the clothes by centrifugal action.

The final rinse of the clothes is accomplished during timed increments eight and nine since the solvent inlet valve 166 remains open upon continued energizing of the inlet valve solenoid 233 for these two increments.

During timed increment ten, solvent valve cam switch S5 opens contact P deenergizing the inlet solenoid 233 and closing the inlet valve 166 which remains closed for the balance of the cycle. At the same time, the main motor cam switch S8 is moved from the low speed tumble contact M to a higher speed contact A to energize the four pole winding 234 and simultaneously spin motor cam switch S7 closes contact T to energize the spin motor winding 235. As previously described, the speed of the clothes basket rotation is initially accelerated by the operation of both the tumble and spin motors 51, 52, and finally brought up to full speed by the spin motor 52. The one-way clutch or overrunning clutch 81 interconnecting the main motor 51 and the basket drive shaft 56 permits the spin motor to drive the basket 50 at a greater speed than the main motor without disconnecting the main motor drive. During spin at high speed, the main motor 51 is energized, but since it is doing no work, very little electrical power is used.

The spinning of the clothes basket 50 at high speed is continued for seven timed increments through the sixteenth increment as shown on FIG. 13 and extracts most of the cleaning liquid from the clothes, leaving them in condition for final drying. Prior to the actuation of motor cam switches S7 and S8 to open contacts A and S at the end of the spin period, heater elements 84 are energized by the closing of cam switch S3 and its associated contact H at the beginning of timed increment sixteen. Because of the high voltage and relatively heavy electric current required for the heater, a heater relay 236 with switch contacts 237a, 237b is used. As shown in the diagram of FIG. 12, the heater relay coil 236 is connected to power line $L_1$ through cam switch H and to the neutral power line N. Upon actuation the relay coil closes relay switch contacts 237a, 237b completing a circuit from $L_1$ to one side of the heater elements 84, the other side being connected to power line $L_2$. At the end of timed increment sixteen the motor cam switches S7 and S8 open contacts A and T, deenergizing the motors 51, 52 and allowing the clothes basket to coast to a stop during one timed increment, which is shown as increment seventeen.

Rotation of the clothes basket 50 is again resumed at the beginning of increment eighteen when the main motor cam switch S8 is cammed into engagement with contact M, starting the main motor 51 at tumble speed for the remainder of the cycle. The clothes are now being tumbled in heated air to evaporate from them the residue of solvent left after centrifugal extraction. The drying is continued until the desired degree of dryness is indicated by a rise in exhaust air temperature as measured by a normally open thermostatic switch 91 located in the exhaust air duct 95 leading from the clothes tub to the lint filter 96. Such variation in exhaust air temperature, as a measure of dryness, is known in the art and need not be described in detail. In general, the exhaust air temperature rises gradually to a more or less steady temperature until the clothes are dry or nearly dry, at which time the temperature rises rapidly. The exhaust duct thermostat 91 is therefore set to close at a predetermined high temperature in the range of rapidly increasing temperature. In the preferred embodiment of the invention this temperature is approximately 115 degrees Fahrenheit.

In order to provide adequate time for drying and to insure proper measurement of dryness, means are provided for interrupting the timer motor 205 to stop the rotation of the timer cams, and for restarting the timer motor 205 upon indication that the clothes have been dried. In the preferred embodiment this is accomplished by inserting a parallel timer motor energizing circuit in series with cam switch S9 and its associated contact ST. Connected to switch contact ST is one side of the normally open sensing thermostatic switch 91, the other being connected to conductor 217 which leads to the timer motor 205 through conductor 217a and advance switch contact 218a. The sensing thermostatic switch 91 is conditioned to energize the timer motor 205 by the closing of cam switch contact ST at the beginning of the fourteenth timed increment. The circuit to the timer motor is not completed, however, until the thermostatic switch 91 closes upon a rise in the temperature of the air exhausted from the clothes tub. At the end of the seventeenth timed increment, the timer motor cam switch S10 opens contact TM and the timer motor stops. The timer cam controls then remain inactive for an indeterminate length of time until thermostatic switch 91 closes indicating that the clothes have been dried to a predetermined degree of dryness. Upon closing, thermostatic switch 91 energizes the timer motor through the eighteenth increment, after which the timer motor cam switch S10 recloses contact TM to establish the normal energizing circuit for the timer motor. Since the heater cam switch H remains closed during the eighteenth increment of cam rotation, the thermostatic switch 91 will remain closed until after the timer motor 205 has reestablished its normal circuit through cam switch contact TM.

Means are provided during the main drying period for insuring that the condenser 120 is operated efficiently to take the evaporated cleaning liquid from the drying air. Following the closing of the cleaning liquid inlet valve 164 upon the opening of cam switch contact P at the end of the washing period, the pump 21 has been circulating liquid through pressure relief valve 162 to the liquid cooling tank 160. In order to use the full capacity of the refrigerating unit for the condenser, the flow of cleaning fluid to the liquid cooling tank 160 is stopped during the eighteenth increment of cam rotation. This is accomplished by a set of normally closed switch contacts 239a, 239b actuated by heater relay 236, and by the deenergizing of conductor 217. When the heater relay 236 closes contacts 237a, 237b to turn on the heating elements 84, switch contacts 239a, 239b are opened to break the circuit to the cleaning liquid thermostatic switch 174 and thus prevent operation of the pump auxiliary relay 240. Upon the opening of cam switch TM to stop the timer motor 205 during drying, conductor 217 is deenergized causing the pump main relay 226 to drop out. Thus, the liquid circulating pump 24 cannot now be started until either the heater relay 236 is deenergized or the timer motor 205 is energized. Either of these events indicates the end of the drying period during which the condenser and refrigerating units are under maximum load.

Concurrently with the closing of the heater energizing circuit the air circulating means is energized by the actuation of cam switch S2 to close contact B which connects one terminal of the blower motor 110 to power line $L_1$. The other terminal of the blower motor 110, as with the other low voltage power and relay coil units, is connected to the neutral power line N. The air diverting valve solenoid 116 has been energized during the entire period of operation up through the drying period for maintaining the air circulation in a closed system as previously described, and remains energized through the twentieth timed increment.

After the heater timer cam switch H opens at the end of the eighteenth increment, the timer motor 205, tumble motor 51, and blower motor 110 continue to be energized to tumble the clothes while unheated air is blown through the system. During this period, the drying control thermostatic switch 91 is disconnected from the circuit by the opening of cam switch ST, and at the beginning of the twenty-first timed increment the air diverter valve solenoid 116 and the air intake valve solenoid 147 are deenergized by the opening of cam switch contact AV. By this actuation of the cam switches, means are provided for conditioning and deodorizing the dried clothes. The air diverter valve 108 is now spring biased to divert exhaust air from the blower 106 to the exhaust stack or conduit 119 and the air intake valve 146 is opened to permit fresh atmospheric air to enter the air circulating system. This deodorizing and conditioning process continues for four timed increments until the blower motor cam switch contact B is opened at the end of the twenty-fourth increment.

During the last or twenty-fifth increment of time, the timer motor and the tumble motor slow speed windings are energized, continuing to tumble the clothes until the cycle ends when the timer cam means completes the twenty-fifth increment and switch TM opens. The timer cam switch S1 is actuated at the beginning of the twenty-fifth increment to close contact U permitting the loading door 242 to be opened and the control circuit placed in condition to start another cycle.

When the air diverter and air intake solenoids 116, 147 are deenergized at the beginning of the twenty-first increment to introduce fresh air, the main power relay 243 of the refrigerating unit is deenergized, opening the associated relay contacts to stop the refrigerating unit. This provides means for reducing the amount of electrical power required and permitting defrosting of the condenser caused by moisture picked up from the clothes freezing on the fins. Provision is made, however, by means of the cleaning liquid thermostatic switch 174 for overriding the timer control and continuing to operate the refrigerating units through relay switch 228 if the temperature of the cleaning liquid is too high, as previously explained in connection with the beginning of the cycle.

Because of the health hazards involved in the use of volatile cleaning liquids and solvents, means are provided for adequate ventilation of the dry cleaning machine. To insure that no vapors from the cleaning liquid enter the operator's area, means are provided for sweeping the inside of the tub with fresh air and exhausting the same to the exhaust stack whenever the loading door of the machine is open, and to insure that the loading door is closed and locked whenever the machine is operating or has malfunctioned.

To accomplish this, a door unlocking means is provided which is operable only if the cycle has been completed. Referring to FIG. 11 of the drawings, a door latching and unlocking mechanism constructed in accordance with one feature of the invention is illustrated. In this illustrative embodiment, the door 242 is shown in closed position. At the free edge portion of the door 242, a handle 243 is securely fixed and projecting inwardly from the handle is a latch member 244 which projects through a slot 246 formed in the machine cabinet panel 247. The latch member is spring biased either by a suitable coil spring or by its own resiliency to press against the edge of the slot away from the opening. In order to guide the latch 244 into the slot 246 and to hold the door closed, the projecting end of the latch has a sloping end face 248 and a notch or shoulder 249 positioned inwardly from the end face. The sloping end face which faces diagonally rearwardly away from the loading opening strikes the outer edge of the slot forcing or camming the latch toward the loading opening until the latch is in line with the locking slot 246. Continued closing movement of the door pushes the latch into the slot allowing the latch to be biased away from the loading opening when the shoulder 249 has entered the slot. The shoulder 249, which faces outwardly toward the frame of the machine, then moves behind the portion of the door panel adjacent the slot and holds the door in closed position. Consequently, once the loading door 242 is closed it cannot be opened by pulling on the handle.

To unlock the door, electrically operated means are provided for moving the latch to unlocked position. In the mechanism of FIG. 11, this means comprises an electrical solenoid 250 and an unlocking pin or striker 251 axially movable upon energization of the solenoid 250.

The unlocking pin 251 and solenoid 250 are mounted on the rear side of the front cabinet panel 247 by a suitable bracket 253 with the projecting end of the pin in alinement with the end of the latch 244 projecting through the locking slot 246 on the side away from the loading opening. The unlocking pin 251 is normally held away from the latch member 244, but upon energization of the solenoid the pin 251 is forced into engagement with the latch and pushes it toward the door opening until the locking shoulder 249 is within the slot and free of engagement with the edge of the slot. The door 242 may now be pulled open. Normally, there are rubber or plastic seals around the edge of the door to insure a snug fit against the cabinet panel. These seals have sufficient resiliency to move the door open as soon as the latch 244 is free. If desired, springs on the door hinges or a spring biased plunger may be used for the same purpose.

In order to insure that the door unlocking means is operative only when the cleaning cycle is complete or has not proceeded to a point of possible hazard, the door unlock solenoid 250 is energized through a series circuit including a normally closed relay contact 215c on the power relay switch 215b and cam switch contact U. The latter switch contact is energized through cam switch S1 only during the first two timed increments and the last timed increment of the cycle. Power relay contact 215c is closed only at the beginning of the cycle before the manual start switch 213 is closed and during the final portion of the cycle after the manual switch is opened by solenoid 224. The latter occurs in the illustrative circuit upon closing of cam switch contact WD. Consequently, switch contacts U and 215c are energized concurrently before the machine is started and during the last timed increment, and as will be seen malfunction of the machine will prevent the timer mechanism from completing the cycle to allow cam switch U to be energized.

So that the loading door 242 will not swing open without notice to the operator, a manual push button switch 254 is inserted in the solenoid energizing circuit. Thus, at the end of the cycle the operator by pushing switch 254 can unlock the door.

Also associated with the door and with the door unlocking mechanism are safety means which deenergize the control mechanism to stop the machine if the door is open or unlocked. For this purpose, a single pole double-throw switch 256 is mounted on the front panel 247 behind a portion of the loading door 242. The door switch has a projecting operator which is axially moved by opening and closing of the door. When the door is closed, a normally open switch contact 256a is closed and is connected to power line L₁ through a safety control switch 257. In series with the door switch contact 256 is an unlock switch 258, which in turn is connected to the main relay coil 208. Unlock switch 258 as shown in FIG. 11 is mounted in the path of movement of the unlock solenoid armature 259 such that the switch actuator 260 is engaged and depressed when the solenoid 250 is deenergized. Operation of the unlock solenoid 250 to unlock the door latch 244 opens the switch 258. Opening of either the door switch 256a or the unlock switch 258 breaks the electrical circuit to main relay 208 causing relay contacts 207a, 207b to open and deenergize the entire control circuit, immediately stopping the machine if for any reason it should be inoperative.

In addition to the means for preventing opening of the loading door except under safe conditions and for preventing operation of the machine if in some unforeseen manner the door is either unlocked or opened during a cycle, means are also provided by use of the door switch 256 to provide proper ventilation of the machine when the loading door is opened. To accomplish this, the door switch 256 has a normally closed contact 256b electrically connected to the blower motor 110 such that upon opening of the door 242, the blower motor will be energized independently of the timer cam switch mechanism to draw air into the machine tub 49 through the open door and exhaust the same to the exhaust stack 119. The exhaust diverter valve 108 will be spring biased to the outside exhaust whenever the door 242 is open since door switch contact 256a must be open and hence break the circuit to the main relay 208.

Safety control means for indicating malfunction of the dry cleaning machine during an operating cycle are also provided, such that when a malfunction is detected the machine is stopped and cannot complete its cycle until the cause is found and corrected. To accomplish this a solenoid operated manual reset switch 257 is placed in the series with the door and unlock safety switches in the energizing circuit for the main relay 208. Opening of the manual reset switch deenergizes the main relay 208, stopping the timer and breaking the power circuit to all of the cam switches. The construction of solenoid operated manual reset switches is commonly known, being in the nature of manually reset circuit breakers or solenoid operated toggle switches.

In accordance with one feature of the present invention, a plurality of indicating means having normally open switch contacts adapted to close upon a predetermined indication are placed in parallel electrical circuits such that any one of them can open the solenoid switch 257. One of these indicating means is the heater safety thermostat 90 mounted at the outlet of the heater 83 and adjacent the heater element 84. One side of the normally open switch of the thermostat 90 is connected to the door switch contact 256a and is energized when the door is closed. The other terminal of the safety thermostatic switch 90 is connected to a switch solenoid coil. Upon a rise in temperature of the heater and heater elements above a predetermined temperature, thermostatic switch 90 will close and energize switch coil 262 to open switch 257 stopping the machine and shutting off the heaters, since heater relay 236 will be deenergized along with the other control circuits.

The remaining safety indicators are effective only at selected portions of the cycle. With reference to FIG. 1, means is shown for indicating a failure of the machine to tumble the clothes during the air drying portion of the cycle. For this purpose, a normally closed, centrifugally operated switch 261 is rotatably driven by a pulley or wheel 263 which bears against the clothes basket drive belt 76. Any suitable centrifugally operated switch such as is commercially available may be used for this purpose. In the present instance the switch 261 is mounted on a pivotally supported arm 264 and the drive wheel 263 is pressed against the drive belt 76 by a tension spring 265. Upon rotation of the pulley or wheel 263 the centrifugal switch 261 opens, and if in case of motor failure or breakage of a drive belt the pulley or wheel 263 does not rotate, the switch 261 remains closed. In the electrical diagram of FIG. 12 centrifugal switch 261 is interposed in series in an electrical circuit from timer cam switch contact WD and switch operating coil 262. With reference to the time chart of FIG. 13, timer switch contact WD is energized for the twenty-first time increment which occurs after the air drying has been completed. If during this interval the final drive belt 76 to the clothes basket 50 is not moving, centrifugal switch 261 will be closed and cause switch operating coil 262 to open the manual reset switch 257 and thus stop the machine.

The centrifugal switch 261 insures that the clothes have been tumbled during drying and are not still partially wet, as would be the case if they had remained in a tight bundle at the bottom of the clothes basket.

During the same time interval, condenser thermostatic switch 176, which is in a parallel circuit with centrifugal switch 261, is also energized. The condenser thermostatic switch 176 is normally open but, upon a rise in temperature in the condenser, will close to energize the switch operating coil 262. If, during the air drying period the condenser has failed to maintain a sufficiently low air temperature, the cleaning liquid vapors will not have been properly removed. Any such improper operation, regardless of cause, will be indicated by thermostatic switch 176.

Means are further provided for indicating failure of the machine to properly extract cleaning liquid from the clothes during the centrifugal extraction period. For this purpose, a second normally closed centrifugal switch 267 is mounted for driving rotation by the spin motor belt 80. The structure and mounting of switch 267 need not be described since it is the same as that of switch 261. The spin indicator switch 267 has one terminal electrically connected to cam switch contact CS and is energized during the seventeenth time increment, which occurs approximately in the middle of the centrifugal extraction period, as shown in FIG. 13. As a result, failure of the spin motor 52 for any reason to drive the belt 80 will be indicated by failure of centrifugal switch 267 to be open when timer cam contact CS is energized. If the centrifugal switch 267 is closed during that timed increment, the machine will be stopped immediately by the energizing of switch coil 262 and opening of switch 257.

In normal use and installation, manual reset switch 257 will be located on the rear of the machine or at some other place where the inexperienced operator cannot reset it. Upon determination of the malfunction which has caused switch 257 to open and correction of the difficulty, switch 257 can be reset. It may be necessary in such circumstances to also reset the timer mechanism to its beginning position when the machine has been stopped midway of the cycle. A single pole, double-throw timer advance switch 218 is provided for this purpose. One terminal 218a of switch 218 is connected to the normal timer motor energizing circuit through conductor 217a, and the second terminal 218b is connected to power line $L_1$, such that it always energized when the master switch 204 is closed. By closing timer advance contact 218b, the timer motor can be energized irrespective of the condition of the control circuits and the timer mechanism advanced as desired.

From the foregoing description, it will be apparent that the applicant has provided a laundry machine adapted particularly for use with organic volatile solvents which is capable of unitary construction and which can be operated by an unskilled operator. The times indicated for individual operations of the machine may be varied to suit individual preferences, and one or more steps, such as rinsing, may be omitted. Similarly the present machine has been described with numerous safety features some of which under various circumstances may be found to be unnecessary, depending upon the operator using the machine.

I claim as my invention:
1. In a clothes cleaning machine for use with volatile cleaning solvents and having timer means for operating said machine through a cycle of cleaning operations, the combination comprising a framework, a clothes treating chamber having a loading opening, a front panel on said framework having a door closing said opening, a latch on said door having a hook resiliently biased to engage said panel and hold said door in closed position, an electrical solenoid having an armature alined to strike and disengage said hook upon energization of said solenoid, a power relay means having a first switch means for initiating operation of said machine and having a second switch, an energizing circuit for said solenoid including in series a manually operated door opening switch, a timer operated cam switch and said second relay switch, said cam switch being closed prior to and during the initial portion of said cycle, said second relay switch being closed prior to commencement of said cycle to permit energization of said solenoid upon closing of said manual switch and being opened concurrently with initiation of said cycle to prevent energization of said solenoid after commencement of said cycle, means for actuating said power relay means for closing said second relay switch during the latter portion of said cycle and after termination thereof, said cam switch being open during said latter portion of said cycle to prevent energization of said solenoid and being closed at the end thereof to permit energization of said unlatching solenoid after completion of said cycle upon closing said manual switch.

2. The combination as defined in claim 1 including a first safety switch positioned to be opened when said door is open, a second safety switch positioned to be opened when said solenoid armature is in unlatching position and safety relay means de-energized upon opening either of said safety switches, said safety relay means having switch means in series in said solenoid energizing circuit for preventing energization of said unlatching solenoid, said safety relay switch means also having a circuit connection to prevent operation of said machine when said safety relay is de-energized.

References Cited by the Examiner

UNITED STATES PATENTS

| | | | |
|---|---|---|---|
| 3,065,619 | 11/1962 | Coss | 68—12 |
| 3,085,415 | 4/1963 | Gosnell | 68—12 |
| 3,106,831 | 10/1963 | Behrens | 68—12 |
| 3,206,950 | 9/1965 | Xeros | 68—12 |

WILLIAM I. PRICE, *Primary Examiner.*